United States Patent [19]
Erck

[11] 3,728,832
[45] Apr. 24, 1973

[54] CONNECTION OF A WINDOW PANE TO A FRAME

[75] Inventor: Karl Erck, Wolfsburg, Germany

[73] Assignee: Volkswagenwerk Aktiengesellschaft, Wolfsburg, Germany

[22] Filed: Nov. 23, 1970

[21] Appl. No.: 91,686

[30] Foreign Application Priority Data

Nov. 26, 1969 Germany...................P 19 59 295.1

[52] U.S. Cl..................................52/400, 52/403
[51] Int. Cl. ........................................E06b 3/62
[58] Field of Search....................52/208, 397–400

[56] References Cited

UNITED STATES PATENTS

| | | | |
|---|---|---|---|
| 3,191,988 | 6/1965 | Sturtevant et al. | 52/400 X |
| 2,610,714 | 9/1952 | Bradley | 52/400 |
| 2,794,218 | 6/1957 | Ramsay | 52/400 |
| 3,245,182 | 4/1966 | Zierold | 52/208 |

FOREIGN PATENTS OR APPLICATIONS

| | | | |
|---|---|---|---|
| 1,028,856 | 5/1966 | Great Britain | 52/400 |
| 1,185,073 | 1/1965 | Germany | 52/400 |
| 1,104,672 | 4/1961 | Germany | 52/397 |
| 1,394,484 | 2/1965 | France | 52/400 |

Primary Examiner—Alfred C. Perham
Attorney—Ernest F. Marmorek

[57] ABSTRACT

In combination: a frame defining a window opening and having flange means surrounding the opening, clamping means of substantially U-shaped profile straddling the flange means and having first and second legs extending substantially parallel to the flange means and respectively on opposite sides thereof, sealing strip means of elastic material and mounted on the frame and flange means and having a first recess therein, a window pane received in the first recess, the clamping means also having a ridge extending therefrom adjacent the bottom of the profile in a direction away from the window pane and the first leg of the profile which is located on that side of the flange means which faces away from the window pane, the sealing strip means having a second recess for receiving the flange means and clamping means including the ridge.

18 Claims, 5 Drawing Figures

Patented April 24, 1973 3,728,832

INVENTOR:
Karl Erck,
BY
His Attorney.

CONNECTION OF A WINDOW PANE TO A FRAME

BACKGROUND OF THE INVENTION

The present invention relates to a connection of a window pane to a frame, and more particularly, to the connection of a windshield of a motor vehicle to the vehicle body, by means of a sealing strip of elastic material to a metal frame surrounding the window opening and with a flange therein; said flange being provided with a ridge running parallel to the edge of the flange at least on that side thereof which faces away from the windshield. The ridge fits into a recess of the sealing strip.

In view of increasingly strict rules issued by governmental agencies to increase the safety of the occupants of motor vehicles during accidents, increased attention has to be paid to the fitting of windows in vehicle bodies and particularly of windshields in order to comply with these governmental directives.

At the present time, window panes are frequently connected to the window frame by means of a rubber sealing strip. For this purpose, the sealing strip is provided with grooves in which are held on one hand the window pane and on the other hand the window frame, by a resilient clamping force. In order to increase the clamping and sealing effect, it is known to place a filling strip in a further groove.

Furthermore, several methods have become known by which window panes, and especially windshields are glued to the frame. However, from a manufacturing standpoint, such methods are inferior to those in which the window panes are clamped elastically rather than glued. Furthermore, it is considerably easier to replace an elastically clamped-in window pane than one that has been glued in.

It is also known, for instance from German Pat. No. 1,185,073 to improve the connection of the sealing strip on the flange by means of interposed connecting means, especially one of U-shaped cross section. In this instance, a U-shaped resilient spring clamp with hooks which are directed inwardly, against the direction of movement, are placed upon the flange. The sealing strip, slipped over the spring clamp, is held by means of a decorative strip which, with one margin therof catches beneath the outer, angular leg of the spring clamp and with its other margin into a groove located on the top side of the sealing strip. Thus, the seal is held in the window opening by means of the decorative strip. In view of the thus absolutely necessary decorative strip, this design is very expensive. Also, the hooks scratch the usually corrosion-resistant surface of the flange so that formation of rust is encouraged. Incidentally, this type of connection makes sense only if the window pane is arranged between the flange and the interior of the car.

French Pat. No. 1,394,484 describes an arrangement in which the flange of the metal frame is provided with a ridge pointing towards the interior of the car, said ridge extending into a recess of the sealing strip. The sealing strip, including the window pane clamped therein is held in the metal frame even upon impact of a force acting on the inside of the window pane. This arrangement, however, has several disadvantages. This type of connection of the window pane cannot subsequently be provided on vehicles the metal frame of which has only a simple flange but no lateral ridge. In view of the traffic conditions today, however, it seems indicated to remodel older vehicles in such a manner that they can comply with the current safety requirements. Furthermore, the production of metal frames as shown in the just-mentioned French patent is extremely difficult since the lateral ridge provided on the flange is not located in the direction in which the metal is drawn.

It is, therefore, an object of the present invention to provide a connection of a window pane to a metal frame, especially the connection of a windshield to a window frame, which will overcome all the above-mentioned disadvantages of the heretofore known such connections.

It is another object of the present invention to provide a connection of the just-mentioned type which can be used with older vehicles that can be remodeled without great expense.

BRIEF SUMMARY OF THE INVENTION:

The problem underlying the present invention has been solved by an arrangement in which the ridge is provided on a spring clamp or clamping strip placed upon the flange of the frame, with the spring clamp or clamping strip having a substantially U-shaped cross-section with one leg located on that side of the flange which faces the window pane (outer side) and the other leg located on that side of the flange which faces away from the window pane (inside) and from which the ridge extends.

Preferably, the ridge is arranged so that it extends substantially over the entire length of the flange and that it forms with the flange at an angle of less than 90°. In this way, the safe connection of the sealing strip on the flange is further strengthened upon a force acting on the inside of the window pane.

BRIEF DESCRIPTION OF THE DRAWINGS

The invention is illustrated by way of example in the attached drawings, in which.

DETAILED DESCRIPTION OF TWO PREFERRED EMBODIMENTS

Figure 1:
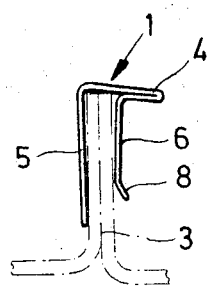
FIG. 1 illustrates one embodiment of the profile of a spring clamp according to the present invention.

Referring now to the drawing in detail, a plurality of individual, approximately U-shaped spring clamps 1 or 2 (FIGS. 1 and 5 respectively) are placed upon a flange 3 of the window opening in such a manner that a ridge 4 thereof provided at the bottom of the clamp (between legs 5 and 6) extends laterally therefrom in the direction towards the interior of the vehicle. Advantageously, the individual spring clamps 1 or 2 are placed from the outside on the flange 3 in such a manner that the left leg 5 of the U-shaped cross section abuts against the flange, with the leg 5 somewhat longer than the right leg 6. With a slight blow on the bottom of the clamp, the spring clamps 1 or 2 are fixed on the flange 3.

Figure 2:
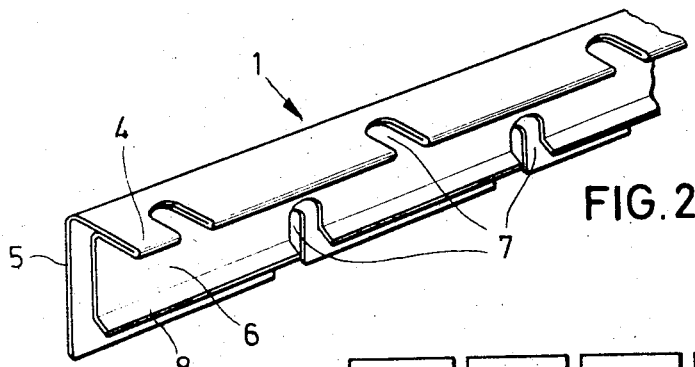
FIG. 2 is a perspective view of a clamping strip designed in accordance with the present invention.

In a particularly advantageous arrangement according to the present invention, a plurality of spring clamps may be combined to a clamping strip. In this manner the time-consuming placement of a large number of individual clamps on the flange is replaced by the fast placement of a few clamping strips on the frame. This arrangement is shown in FIG. 2. The clamping strip which in profile cannot be distinguished from the spring clamp according to FIG. 1, is provided with cut-out sections 7 in the legs and in the ridge so that they adapt very well to the contour of the flange 3 where it is curved. Preferably, the cut-out sections 7 in the ridge 4 are off-set with respect to those in the legs 5 and 6.

Figure 3:
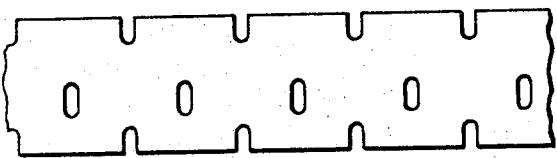
FIG. 3 shows a blank from which the clamping strip of FIG. 2 with the profile of FIG. 1 can be made by a bending process.

The spring clamp and the clamping strip are preferably designed in such a manner that they may be produced, including the ridge, from a pre-fabricated blank, solely by a bending process. FIG. 3 shows such a blank into which holes have been stamped which later become the cut-out sections 7. Upon bending, from this blank, the spring clamp according to FIG. 1 or the clamping strip of FIG. 2 is obtained. From a similar blank (not shown) also the spring clamp of FIG. 5 or a clamping strip of the same profile, may be formed by a simple bending process. Whereas in the spring clamp 1, the ridge 4 is formed from a double thickness of sheet metal, and the right leg 6 from a single thickness, with the profile of the spring clamp 2 the reverse is the case. The leg 6 of the spring clamp 1 (and that of the clamping strip according to FIG. 2) is bent in a direction towards the ridge 4 at its free end 8 in order to prevent during assembly damage to the interior of the car roof.

Figure 4:
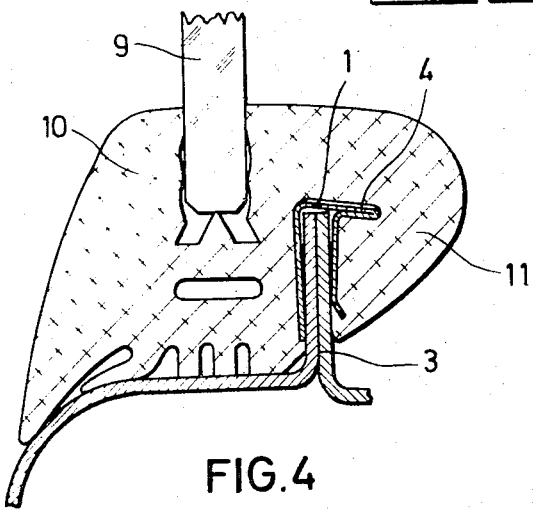
FIG. 4 is a cross-section through a windshield frame of a motor vehicle with a sealing strip and a spring clamp according to the present invention.

After the spring clamps or clamping strips have been mounted on the flange, the window 9 (FIG. 4) with the surrounding sealing strip 10 is pressed into the window opening of the car body against the flange 3. By means of an assembly string or rope well known in the art, the holding lip 11 of the seal strip 10 is pulled over the flange. During this process, the ridge 4 of the spring clamp or the clamping strip becomes caught in a recess of the sealing strip 10 provided for this purpose and prevents the sealing strip from being pressed out of the window frame even upon impact of a large force on the inside of the window pane 9.

The spring clamp or clamping strip according to the present invention has the further advantage that the interior decoration of the car roof can be connected in a very simple manner in the area of the window. The marginal strip of the decorative textile material is merely clamped by means of the spring clamp onto the flange and does not have to be glued thereon. As mentioned above, in order to prevent damage to this textile material during assembly, the interior leg of the U-shaped cross-section has its free end 8 bent in a direction towards the ridge. The assembly of the spring clamp is made even easier due to the fact that the outer leg 5 is somewhat longer than the inner leg 6.

Figure 5:
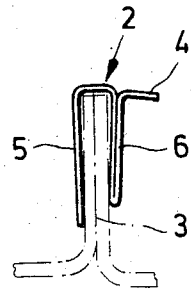
FIG. 5 is a side view of a further embodiment of a spring clamp according to the present invention.

In order to produce the ridge at the spring clamp or clamping strip, several possibilities exist. Thus, for instance, the ridge can be formed by extending or elongating the bottom of the U-shaped cross-section on that side thereof which faces away from the window pane and by bending it back to the starting point of the leg on that side (FIG. 1). On the other hand, it is possible to obtain the ridge by bending back that leg of the spring clamp which is located on the side facing away from the window pane in the area of this leg up to the height of the bottom and by bending the same off at this point (FIG. 5).

From the above, it is apparent that although the invention has been described hereinbefore with respect to certain specific embodiments thereof, it is evident that many modifications and changes may be made without departing from the spirit of the invention. Accordingly, by the appended claims, we intend to cover all such modifications and changes as fall within the true spirit and scope of this invention.

I claim:

1. In combination: frame means defining a window opening and having flange means surrounding said opening, clamping means of substantially U-shaped profile straddling said flange means and having first and second legs extending substantially parallel to said flange means and respectively on opposite sides thereof, sealing strip means of elastic material and mounted on said frame means and flange means and having a first recess therein, a window pane received in said first recess, said clamping means also having a ridge extending therefrom adjacent the bottom of the profile in a direction away from said window pane and said first leg of said profile which is located on that side of the flange means which faces away from said window pane, said sealing strip means having a second recess for receiving said flange means and clamping means including said ridge.

2. The combination according to claim 1, wherein said ridge extends substantially over the entire length of said flange means.

3. The combination according to claim 1, wherein said ridge forms with said flange means an angle of less than 90°.

4. The combination according to claim 1, wherein said first leg of said clamping means has its free end bent-off in a direction toward said ridge.

5. The combination according to claim 3, wherein said first leg has its free end bent off in a direction toward said ridge.

6. The combination according to claim 1, wherein said first leg is shorter than said second leg.

7. The combination according to claim 1, wherein said clamping means is composed of a large number of individual resilient clamps.

8. The combination according to claim 7, wherein several of said resilient clamps are combined to a clamping strip.

9. The combination according to claim 8, wherein said clamping strip is provided with a first series of cut-out portions in said ridge which are spaced in longitudinal direction thereof, and a second series of cut-out portions provided in said first and second legs of said clamping strip, respectively spaced from each other in longitudinal direction of said strip.

10. The combination according to claim 9, wherein said first cut-out portions are off-set in longitudinal direction of said strip with respect to said second cut-out portions.

11. The combination according to claim 7, wherein each spring clamp including said ridge is made from one blank by bending.

12. The combination according to claim 8, wherein said clamping strip including said ridge is made from one blank by bending.

13. The combination according to claim 1, wherein said ridge is formed by extending the material of the bottom of said U-shaped profile beyond said first leg and by bending the same back to the start of said first leg adjacent said bottom.

14. The combination according to claim 1, wherein said ridge is formed by folding the material of said first leg upon itself and by bending the same off adjacent said bottom.

15. The combination of claim 7, wherein said ridge is formed by extending the material of the bottom of said U-shaped profile beyond said first leg and by bending the same back to the start of said first leg adjacent said bottom.

16. The combination according to claim 8, wherein said ridge is formed by extending the material of the bottom of said U-shaped profile beyond said first leg and by bending the same back to the start of said first leg adjacent said bottom.

17. The combination according to claim 7, wherein said ridge is formed by folding the material of said first leg upon itself and by bending the same off adjacent said bottom.

18. The combination according to claim 8, wherein said ridge is formed by folding the material of said first leg upon itself and by bending the same off adjacent said bottom.

* * * * *